United States Patent

Halm

[11] Patent Number: 6,085,179
[45] Date of Patent: Jul. 4, 2000

[54] METHOD OF CHARGING FOR A COMMUNICATIONS SERVICE, AS WELL AS A CHARGE COMPUTER, EXCHANGE, AND COMMUNICATIONS NETWORK

[75] Inventor: Volker Halm, Löchgau, Germany

[73] Assignee: Alcatel, Paris, France

[21] Appl. No.: 09/023,033

[22] Filed: Feb. 13, 1998

[30] Foreign Application Priority Data

Feb. 21, 1997 [DE] Germany .......................... 197 06 999

[51] Int. Cl.⁷ .................................................. G06G 7/00
[52] U.S. Cl. ........................................... 705/400; 455/406
[58] Field of Search .................................... 705/400, 418; 455/2, 405, 406; 379/111, 114

[56] References Cited

U.S. PATENT DOCUMENTS

| | | | |
|---|---|---|---|
| 5,333,186 | 7/1994 | Gupta | 379/201 |
| 5,488,655 | 1/1996 | Hamlen | 379/114 |
| 5,570,417 | 10/1996 | Byers | 379/115 |

FOREIGN PATENT DOCUMENTS

| | | |
|---|---|---|
| 0809387 | 11/1997 | European Pat. Off. . |
| 3305978 | 8/1984 | Germany . |
| 19516364 | 11/1995 | Germany . |
| 19524898 | 1/1996 | Germany . |
| 9524094 | 9/1995 | WIPO . |

OTHER PUBLICATIONS

Patent Abstracts of Japan, vol. 097, No. 006, Jun. 30, 1997 & Publication No. 09046453 (Canon Inc), Feb. 14, 1997.

Patent Abstracts of Japan, vol. 097, No. 002, Feb. 28, 1997 & JP 08 256229 A (Toshiba Corp) Oct. 1, 1996.

Hiroshi Shimizu et al, "Evolution of Billing Architecture" Proceeding of the International Switching Symposium, ISS 1992, Oct. 25–30, 1992, pp. 299–303.

*Primary Examiner*—Emanuel Todd Voeltz
*Assistant Examiner*—Thomas A Dixon
*Attorney, Agent, or Firm*—Ware, Fressola, Van Der Sluys & Adolphson LLP

[57] ABSTRACT

A method of determining fees for chargeable telecommunications (TK) services, whereby a counting device is used to calculate the amount of charges accumulated by an individual customer during a predetermined billing period, is characterized in that after exceeding a threshold value of the accumulated amount of charges, which can be individually established for the customer by the provider of the TK services, a limited low-fee, preferably a no-fee usage of the TK services is made available to the customer. To announce the start of the low-fee usage, a signal is preferably transmitted to the customer. This contributes to a further increase in the incentive of using the TK service, and causes an increased utilization of the respective TK service system as well as an increase in the service provider's sales.

16 Claims, 1 Drawing Sheet

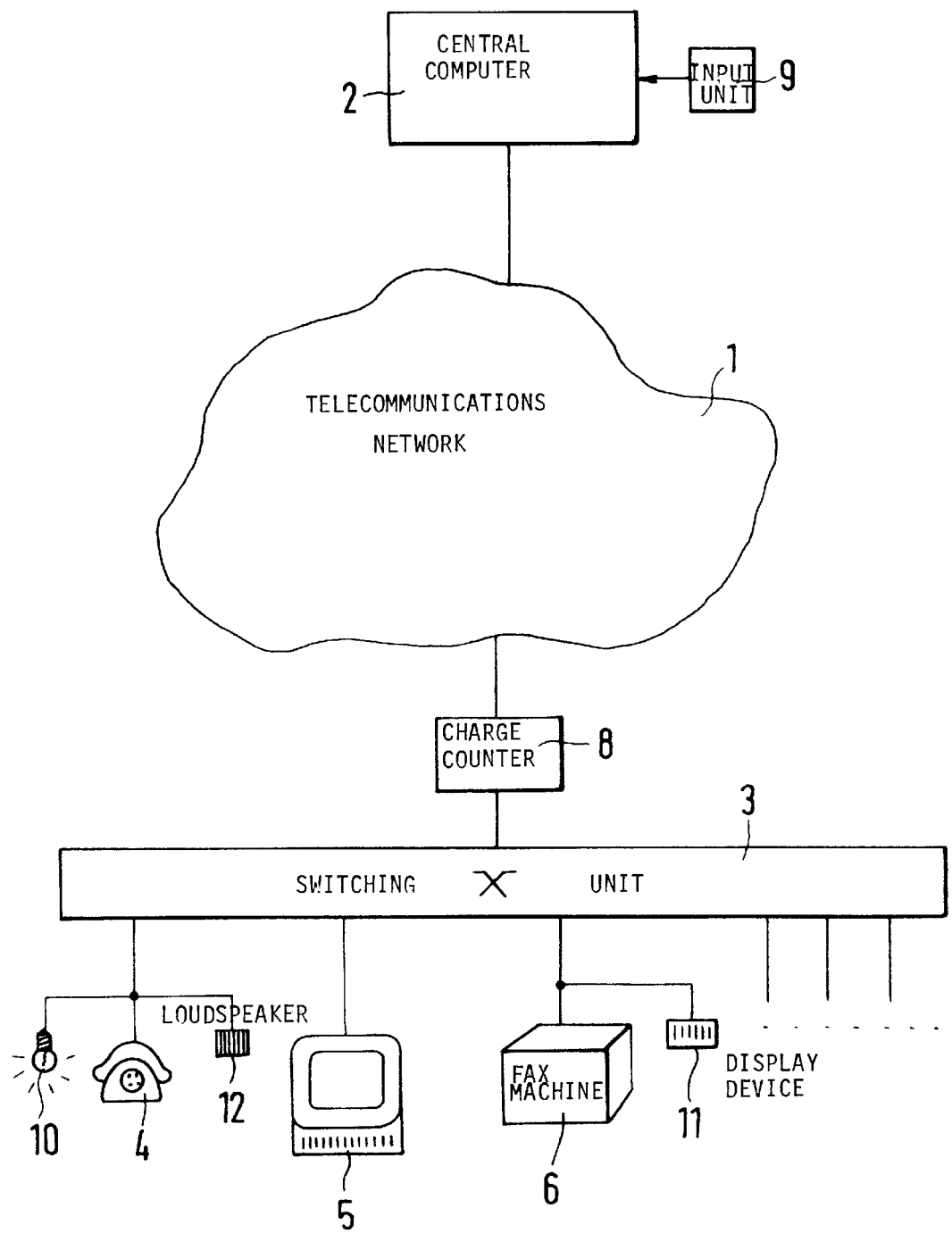

METHOD OF CHARGING FOR A COMMUNICATIONS SERVICE, AS WELL AS A CHARGE COMPUTER, EXCHANGE, AND COMMUNICATIONS NETWORK

TECHNICAL FIELD

The invention concerns a method of determining fees for chargeable telecommunications (TK) services, whereby a counting device is used to calculate the amount of charges accumulated by an individual customer during a predetermined billing period.

BACKGROUND OF THE INVENTION

The use of telecommunications (TK) services, for example telephoning, telefaxing, access to data base systems and such, is not as a rule without cost for the user, but is charged to the customer by the service provider by means of rate-based fees. In addition to fixed basic charges, most bills also contain usage-dependent amounts of fees for the use of chargeable services, where the latter often make up the lion's share of the bill. The usual way of rating in telecommunications is described for example in the "Textbook of Telecommunications" volume 1, Technical Publishers Schiele & Schön GmbH, Berlin 1986, pages 614 to 620.

Usually the fee structures for determining the charges are relatively rigid and only differ from each other in distance zones and times of day. In most cases discounts are offered for sundays and holidays, as opposed to working days. But in principle most cases provide the same charging structure for every user of the respective TK services.

Concepts of individual subscriber rating have been introduced lately to increase the incentive of using a certain TK service, whereby for example connections of a user to other TK terminals in the telephone area, which can be individually established for the respective subscriber (represented by the corresponding telephone numbers) are billed at a more favorable rate.

SUMMARY OF THE INVENTION

In this regard the object of the present invention is to present a method of the kind named in the beginning, which contributes to a further increase in the incentive of using the respective TK service, and causes an increased utilization of the respective TK service system, and an increase in the service provider's sales.

The invention achieves this object in a surprisingly simple but still effective way, in that after exceeding a threshold value of the amount of accumulated charges, which can be individually established for the customer by the provider of the TK services, a limited low-fee, preferably a no-fee usage of the TK services is made available to the customer.

To that end the actual usage of a TK service by the respective customer is determined by monitoring the amount of charges accumulated during a billing period. A charging rate is assigned to the established usage, and a more favorable rate is assigned when a sales threshold, which can be established by the service provider, is reached. This favorable rate can be the granting of low-fee units for example, or preferably a specific number of free units, but also a low-fee or a no-fee period of time for further use of the TK service.

Especially preferred is a configuration of the method of the invention, whereby a signal is transmitted to the customer to announce the start of the low-fee usage of the TK services. This makes it clear to the customer that the fee threshold is about to be exceeded, so that he can immediately adjust his usage accordingly. For example, in order to take advantage of the limited discount fee, the customer can now extend somewhat the telephone call which he would normally have kept short.

A development of this configuration is advantageous, whereby the announcement of the start of the low-fee usage is displayed optically, preferably by lighting a lamp in the customer's TK terminal. Particularly in the area of telecommunications services, the acoustic signal transmission is not disturbed by an optical signal display while the service is being used and the customer can be simultaneously and unequivocally informed of the limited discount fee that was individually provided for him.

In a further variation of the configuration of the invention method, the start of the low-fee usage is announced acoustically, possibly and preferably by an automated announcement and/or a specific signal tone in the customer's TK terminal. An advantage of this announcing method is that no additional terminal devices need to be provided, such as for example signal lights. Furthermore, an announcement can also provide additional information in an uncomplicated manner to the customer about the type of discount fee.

A further advantageous variation provides that the extent of the low-fee usage of the TK services is also transmitted to the customer, for example the number of low-fee or no-fee units, or an amount of free usage, or the time of a low-fee or no-fee usage. This makes it easier for the customer to decide about the possible use of the limited individual discount fee being provided, and increases the incentive for a greater usage of the TK service by the customer.

Particularly preferred is a variation of the invention method, whereby a signal announcing the end of the low-fee usage of the TK services is transmitted to the customer. This indicates to the customer in a fair manner that he must pay the normal rate for any further usage of the TK service. The end of the low-fee usage time can also be announced acoustically and/or optically.

In the simplest of cases, the individual customer-specific threshold value, which when exceeded is followed by a limited discount fee, is established manually by the service provider of the TK services in accordance with business policy considerations. In that case a distinction can be made for example of different customer groups.

Another possibility of determining the threshold is to derive the individual customer-specific threshold from a statistic of previous bills sent to the customer. In this way the individual usage behavior of every customer can be taken into consideration, and an increase in the usage of the offered TK services can be rewarded during the last billing period for example.

In a particularly advantageous variation of this configuration, the determined threshold value is automatically entered into the TK system, so that no separate decisions are required in individual cases, but only a total strategy must be entered into the system in the form of corresponding conditions.

A particular usage incentive which results in a further increased utilization and finally increased sales is achieved with a configuration of the invention method, whereby several staggered threshold values are provided within the same billing period. This offers the customer the possibility of obtaining further price advantages, in spite of a considerable expansion of his current usage as compared to the extent he had originally planned.

Further advantages of the invention can be found in the description and in the drawing. The previously cited and further listed features can also be used individually or by combining several of them. The illustrated and described configurations should not be taken as a final listing, but rather have an exemplary character for the description of the invention.

BRIEF DESCRIPTION OF THE DRAWING

The invention is illustrated in the drawing and will be explained in greater detail by means of an embodiment.

BEST MODE FOR CARRYING OUT THE INVENTION

The FIGURE illustrates an operating schematic diagram of a TK system to which the method of the invention can be applied.

A TK switching unit 3 is connected to a telecommunications (TK) network 1, which is operated and serviced by a central computer 2, and a certain number of TK terminals such as for example a telephone 4, a PC 5, a fax machine 6 and such are connected thereto. The TK switching unit 3 takes over the switching of connections between various TK terminals which are connected to the same switching unit, or to other switching units with access to the TK network that are not shown in the present drawing.

A charge counter 8, which in the illustrated embodiment is switched between the central computer 2 and the respective TK switching unit 3, contains a counting device which determines the respective amount of charges accumulated during a predetermined billing period for use of the TK services of the TK network 1 by one of the connected TK terminals 4, 5, 6, . . . After exceeding a threshold value of the amount of accumulated charges, which is individually established by the network operator for the owner of the respective TK terminal, the user of the respective TK terminal is offered a limited low-fee, preferably a no-fee usage of the offered TK service. To that end the corresponding individual customer-specific threshold value is transmitted by the service provider via an input unit 9 to the central computer 2, which routes this information further to the pertinent charge counter 8.

Instead of a manual input of the customer-specific threshold values via the input unit 9, an automated and continuously adapted computation of the threshold values can take place in the central computer 2, for example with the aid of a statistic of previous bills sent to the customer. The established threshold values can then be entered automatically into the TK system.

To provide an incentive to the customer for an increased usage of the offered TK services, a signal is transmitted to indicate the start of a low-fee usage, possibly also its extent and its end. The indication can take place for example by lighting a lamp 10, by providing a corresponding notice on a display device 11 which can contain LCD elements for example, or by the appearance of a corresponding optical indication on a screen, for example the screen of the personal computer 5. In addition, or as an alternative, the notice can also be made acoustically, for example by means of an announcement in a telephone device 4, and/or by producing a signal tone in the respective TK terminal, or in a loudspeaker 12 that is connected thereto.

To increase the incentive of greater usage of the offered TK services by the final user, several staggered threshold values can be provided within the same billing period, so that a multiple reward is given to the usage-enthusiastic customer.

The method of the invention can be applied to any type of telecommunications services, and also to the above-described very different TK systems.

What is claimed is:

1. A method of determining fees for chargeable telecommunications (TK) services, whereby a counting device is used to calculate the amount of charges accumulated by an individual customer during a predetermined billing period, characterized in that, after exceeding a preset value of the accumulated amount of charges which can be individually established for the customer by the provider of the TK services, a limited low-fee, preferably a no-fee usage of the TK services is made available to the customer, characterized in that several different preset values are provided within the same billing period.

2. A method as claimed in claim 1, characterized in that a signal is transmitted to the customer to announce the start of the low-fee usage of the TK services.

3. A method as claimed in claim 2, characterized in that the announcement of the start of the low-fee usage takes place optically, preferably by lighting a lamp (10) in a TK terminal (4) of the customer.

4. A method as claimed in claim 3, characterized in that indication of the start of the low-fee usage takes place acoustically, preferably by an automated announcement or a specific signal tone in the customer's TK terminal.

5. A method as claimed in claim 4, characterized in that the extent of the low-fee usage of the TK services including a number of low-fee or no-fee units or an amount of free usage, or the time period of a low-fee or a no-fee usage is also transmitted to the customer.

6. A method as claimed in claim 5, characterized in that a signal to announce the end of the low-fee usage of the TK services is also transmitted to the customer.

7. A method as claimed in claim 2, characterized in that the indication of the start of the low-fee usage takes place acoustically, preferably by an automated announcement or a specific signal tone in the customer's TK terminal.

8. A method as claimed in claim 2, characterized in that the extent of the low-fee usage of the TK services including a number of low-fee or no-fee units or an amount of free usage, or the time period of a low-fee or a no-fee usage is also transmitted to the customer.

9. A method as claimed in claim 2, characterized in that a signal to announce the end of the low-fee usage of the TK services is also transmitted to the customer.

10. A method as claimed in claim 1, characterized in that the individual customer-specific preset value is manually established by the service provider.

11. A method of determining fees for chargeable telecommunications (TK) services, whereby a counting device is used to calculate the amount of charges accumulated by an individual customer during a predetermined billing period, characterized in that, after exceeding a preset value of the accumulated amount of charges which can be individually established for the customer by the provider of the TK services, a limited low-fee, preferably a no-fee usage of the TK services is made available to the customer;

a signal is transmitted to the customer to announce the start of the low-fee usage of the TK services;

the announcement of the start of the low-fee usage takes place optically, preferably by lighting a lamp (10) in a TK terminal (4) of the customer;

the indication of the start of the low-fee usage takes place acoustically, preferably by an automated announcement or a specific signal tone in the customer's TK terminal;

the extent of the low-fee usage of the TK services is also transmitted to the customer, preferably by the number of low-fee or no-fee units or an amount of free usage, or the time period of a low-fee or a no-fee usage;

a signal to announce the end of the low-fee usage of the TK services is also transmitted to the customer; and the individual customer-specific preset value is manually established by the service provider.

12. A method of determining fees for chargeable telecommunications (TK) services, whereby a counting device is used to calculate the amount of charges accumulated by an individual customer during a predetermined billing period, characterized in that, after exceeding a preset value of the accumulated amount of charges which can be individually established for the customer by the provider of the TK services, a limited low-fee, preferably a no-fee usage of the TK services is made available to the customer;

a signal is transmitted to the customer to announce the start of the low-fee usage of the TK services;

the announcement of the start of the low-fee usage takes place optically, preferably by lighting a lamp (10) in a TK terminal (4) of the customer, the indication of the start of the low-fee usage takes place acoustically, preferably by an automated announcement or a specific signal tone in the customer's TK terminal;

the extent of the low-fee usage of the TK services is also transmitted to the customer, preferably by the number of low-fee or no-fee units or an amount of free usage, or the time period of a low-fee or a no-fee usage;

a signal to announce the end of the low-fee usage of the TK services is also transmitted to the customer; and the individual customer-specific preset value is determined from a statistic of previous bills sent to the customer, wherein the statistic represents an individual usage behavior of each customer.

13. A method as claimed in claims 12, characterized in that the established preset value is automatically entered into the TK system.

14. A method as claimed in claim 13, characterized in that several different preset values are provided within the same billing period.

15. A method of determining fees for chargeable telecommunications (TK) services, whereby a counting device is used to calculate the amount of charges accumulated by an individual customer during a predetermined billing period, characterized in that, after exceeding a preset value of the accumulated amount of charges which can be individually established for the customer by the provider of the TK services, a limited low-fee, preferably a no-fee usage of the TK services is made available to the customer, characterized in that the individual customer-specific preset value is determined from a statistic of previous bills sent to the customer, wherein the statistic represents an individual usage behavior of each customer.

16. A method as claimed in claim 15, characterized in that the established preset value is automatically entered into the TK system.

* * * * *